(12) United States Patent  
Liu et al.

(10) Patent No.: US 9,319,111 B2
(45) Date of Patent: Apr. 19, 2016

(54) CODE ALLOCATION FOR UPLINK MIMO

(75) Inventors: Jinhua Liu, Beijing (CN); Johan Hultell, Solna (SE); Johan Bergman, Stockholm (SE); Qingyu Miao, Beijing (CN)

(73) Assignee: Optis Wireless Technology, LLC, Plano, TX (US)

(*) Notice: Subject to any disclaimer, the term of this patent is extended or adjusted under 35 U.S.C. 154(b) by 80 days.

(21) Appl. No.: 13/376,744

(22) PCT Filed: Nov. 30, 2011

(86) PCT No.: PCT/SE2011/051453
§ 371 (c)(1),
(2), (4) Date: Jan. 20, 2012

(87) PCT Pub. No.: WO2012/099519
PCT Pub. Date: Jul. 26, 2012

(65) Prior Publication Data
US 2012/0182973 A1 Jul. 19, 2012

Related U.S. Application Data

(60) Provisional application No. 61/433,310, filed on Jan. 17, 2011.

(51) Int. Cl.
*H04B 7/00* (2006.01)
*H04B 7/04* (2006.01)
(Continued)

(52) U.S. Cl.
CPC ............ *H04B 7/0404* (2013.01); *H04B 7/0417* (2013.01); *H04J 13/20* (2013.01); *H04B 7/0639* (2013.01)

(58) Field of Classification Search
CPC .. H04B 7/0404; H04B 7/0693; H04B 7/0417; H04B 7/0639; H04B 7/0617; H04J 13/20; H04L 27/362; H04L 1/0625; H04L 1/0668

USPC .......................... 370/319, 329, 335, 337, 339
See application file for complete search history.

(56) References Cited

U.S. PATENT DOCUMENTS 7,039,092 B1 * 5/2006 Cao et al. ........................ 375/140
7,548,528 B2 * 6/2009 Breuer et al. .................. 370/335
(Continued)

FOREIGN PATENT DOCUMENTS

EP 1814252 A1 8/2007
WO 2006059088 A1 6/2006

OTHER PUBLICATIONS

Nokia Siemens Networks et al., "Options for uplink closed loop TX diversity & beamforming", 3GPP TSG-RAN WG1 Meeting #62, Aug. 23-27, 2010, Madrid, Spain, R1-104914.
(Continued)

*Primary Examiner* — Chandrahas Patel
*Assistant Examiner* — Lan Huong Truong

(57) ABSTRACT

The disclosure relates to methods and apparatuses that allow for channelization code allocation adapted for uplink MIMO transmissions. A method for use in a user equipment of a telecommunication system comprises spreading data symbols of a plurality of streams to be transmitted from the user equipment as MIMO transmissions. The step of spreading the data symbols comprises allocating, for each stream, at least one channelization code (62) to be applied for spreading the data symbols of the stream. The plurality of streams are allocated channelization codes (62) from a predefined code tree (61) of applicable channelization codes such that any channelization code (62) is allocated to more than one stream only if there is no applicable channelization code left in the code tree (61) which currently is not allocated for any stream. The channelization code allocation scheme makes it possible to avoid inter-stream interference in many scenarios of uplink MIMO transmissions.

18 Claims, 7 Drawing Sheets

(51) Int. Cl.
*H04J 13/20* (2011.01)
*H04B 7/06* (2006.01)

(56) References Cited

U.S. PATENT DOCUMENTS

| 8,355,424 | B2* | 1/2013 | Xi et al. | 375/144 |
|---|---|---|---|---|
| 2004/0190482 | A1* | 9/2004 | Baum et al. | 370/347 |
| 2004/0213187 | A1* | 10/2004 | Fujil | 370/335 |
| 2005/0053041 | A1* | 3/2005 | Cheong | 370/335 |
| 2005/0094816 | A1* | 5/2005 | Lindoff et al. | 380/268 |
| 2007/0147309 | A1* | 6/2007 | Brouwer | 370/335 |
| 2007/0147333 | A1* | 6/2007 | Makhijani | 370/347 |
| 2007/0195809 | A1* | 8/2007 | Blanz et al. | 370/426 |
| 2009/0103497 | A1* | 4/2009 | Fernandez-Corbaton et al. | 370/335 |
| 2011/0170527 | A1* | 7/2011 | Yamamoto et al. | 370/338 |

OTHER PUBLICATIONS

3rd Generation Partnership Project; Technical Specification Group Radio Access Network; Medium Access Control (MAC) protocol specification (Release 8); 3GPP TS 25.321 V8.6.0 (Jun. 2009), 185 pgs.

3rd Generation Partnership Project; Technical Specification Group Radio Access Network; Spreading and modulation (FDD) (Release 10); 3GPP TS 25.213 V10.0.0 (Sep. 2010), 39 pgs.

3rd Generation Partnership Project; Technical Specification Group Radio Access Network; Universal Terrestrial Radio Access (UTRA); Uplink transmit diversity for High Speed Packet Access (HSPA) (Release 10); 3GPP TR 25.863 V10.0.0 (Jul. 2010), 212 pgs.

Huawei, New WI proposal: Uplink Transmit Diversity for HSPA, 3GPP TSG-RAN Meeting #50 RP-101438 Istanbul, Turkey, Dec. 7-10, 2010, with comments, version 1, 5 pgs.

International Search Report, International application No. PCT/SE2011/051453, mailed on Oct. 5, 2012, 4 pgs.

Qualcomm Incorporated, SI proposal for Uplink MIMO; 3GPP TSG-RAN Meeting #50 RP-101432 Istanbul, Turkey, Dec. 7-10, 2010, 6 pgs.

Written Opinion of the International Searching Authority, International application No. PCT/SE2011/051453, 9 pgs.

Huawei, New WI proposal: Uplink Transmit Diversity for HSPA, 3GPP TSG-RAN Meeting #50 RP-101438 Istanbul, Turkey, Dec. 7-10, 2010, with comments, version 2, 4 pgs.

Huawei, New WI proposal: Uplink Transmit Diversity for HSPA, 3GPP TSG-RAN Meeting #50 RP-101438 Istanbul, Turkey, Dec. 7-10, 2010, with comments, version 3, 6 pgs.

Huawei, New WI proposal: Uplink Transmit Diversity for HSPA, 3GPP TSG-RAN Meeting #50 RP-101438 Istanbul, Turkey, Dec. 7-10, 2010, with comments, version 4, 5 pgs.

Huawei, New WI proposal: Uplink Transmit Diversity for HSPA, 3GPP TSG-RAN Meeting #50 RP-101438 Istanbul, Turkey, Dec. 7-10, 2010, with comments, version 6, 5 pgs.

International Preliminary Report on Patentability for PCT/SE2011/051453 dated Jan. 17, 2011, 8 pgs.

* cited by examiner

CODE ALLOCATION FOR UPLINK MIMO

TECHNICAL FIELD

The embodiments described herein relate to spreading of data symbols transmitted in a communications system and in particular to allocation of channelisation codes for spreading of data symbols in connection with uplink Multiple-Input Multiple-Output (MIMO) transmissions.

BACKGROUND

There is a continuous development of new generations of mobile communications technologies to cope with increasing requirements of higher data rates, improved efficiency and lower costs. High Speed Downlink Packet Access (HSDPA) and High Speed Uplink Packet Access (HSUPA), together referred to as High Speed Packet Access (HSPA), are mobile communication protocols that were developed to cope with higher data rates than original Wideband Code Division Multiple Access (WCDMA) protocols were capable of. The 3rd Generation Partnership Project (3GPP) is a standards-developing organization that is continuing its work of evolving HSPA and creating new standards that allow for even higher data rates and improved functionality.

In a radio access network implementing HSPA, a user equipment (UE) is wirelessly connected to a radio base station (RBS) commonly referred to as a NodeB (NB). A radio base station is a general term for a radio network node capable of transmitting radio signals to a UE and receiving signals transmitted by a UE.

3GPP has evaluated the potential benefits of uplink transmit (Tx) diversity in the context of HSUPA. With uplink transmit diversity, UEs that are equipped with two or more transmit antennas are capable of utilizing all of them for uplink transmissions. This is achieved by multiplying a UE output signal with a set of complex pre-coding weights, a so-called pre-coding vector with one pre-coding weight for each physical transmit antenna. The rationale behind uplink transmit diversity is to adapt the pre-coding weights so that user and network performance is maximized. Depending on UE implementation the antenna pre-coding weights may be associated with different constraints. Within 3GPP two classes of transmit diversity are considered:

Switched antenna transmit diversity, where the UE at any given e instance transmits from one of its antennas only.

Beamforming where the UE at a given time-instance can transmit from more than one antenna simultaneously. By means of beamforming it is possible to shape an overall antenna beam in the direction of a target receiver.

During 2009 and 2010 the 3GPP evaluated the merits of open loop beam forming and open loop antenna switching for uplink transmissions in WCDMA/HSPA. These techniques are based on that UEs equipped with multiple transmit antennas exploit existing feedback e.g. feedback transmitted on the Fractional Dedicated Physical Channel (F-DPCH) or on the E-DCH HARQ Acknowledgement Indicator Channel (E-HIGH) to determine a suitable pre-coding vector in an autonomous fashion. The purpose of pre-coding the signals is to "maximize" the signal to interference ratio (SIR) at the receiving NodeB. Since the network is unaware of the applied pre-coding weights the NodeBs will experience a discontinuity in the measured power whenever a change in pre-coding weights occurs. A summary of the 3GPP studies on open loop transmit diversity techniques can be found in 3GPP's technical report TR 25.863, UTRA: Uplink Transmit Diversity for High Speed Packet Access.

Recently there have been proposals for introducing closed loop transmit diversity for WCDMA/HSPA. Closed loop transmit diversity refers to both closed loop beam forming and closed loop antenna switching. At the 3GPP meeting RAN #50 a work item with the purpose of specifying support for closed loop transmit diversity was agreed. Contrary to the open loop techniques where the UE decides pre-coding weights autonomously, closed loop techniques are based on that the network, e.g., the serving NodeB, selects the pre-coding vector with which the signal is multiplied. In order to signal the necessary feedback information from the network to the UE, the NodeB can either rely on one of the existing physical channels, e.g., F-DPCH, or a new feedback channel could be introduced.

Uplink multiple-input-multiple-output (MIMO) transmission is another related technique that has been proposed as a candidate for WCDMA/HSPA in 3GPP standard release 11. A study item on uplink MIMO for WCDMA/HSUPA was started at the 3GPP RAN #50 plenary meeting. For uplink MIMO, different data is transmitted from different virtual antennas in so-called streams. Each virtual antenna corresponds to a different pre-coding vector. Note that closed loop beam forming can be viewed as a special case of uplink MIMO where no data is scheduled on one of the possible virtual antennas.

MIMO technology is mainly beneficial in situations where the "composite channel" is strong and has high rank. The term composite channel includes the potential effects of transmit antenna(s), PAs, as well as the radio channel between the transmitting and receiving antennas. The rank of the composite channel depends on the number of uncorrelated paths between the transmitter and the receiver. Single-stream transmissions, i.e. beam forming techniques, are generally preferred over MIMO transmissions in situations where the rank of the composite channel is low e.g. where there is a limited amount of multi-path propagation and cross polarized antennas are not used, and/or the path gain between the UE and the NodeB is weak. This results from a combined effect of that the theoretical gains of MIMO transmissions is marginal at low SIR operating point and that inter-stream interference can be avoided in case of single-stream transmissions.

For HSDPA with MIMO, which was introduced in Rel-7 of the 3GPP standard, there is a High-Speed (HS) code reuse between transmissions from two different virtual antennas. More specifically, for downlink operation it was specified in the 3GPP standard that the transmissions from the two virtual antennas—i.e. the two streams—should use exactly the same spreading codes. To a large extent, this was motivated by the fact that the HS codes are a resource that is shared amongst all UEs served by a particular cell. While the benefits with this approach are that it provides an economic use of the available HS codes and also reduce the receiver complexity, a drawback is that the inter-stream interference becomes an issue for dual-stream transmission in the downlink since the different streams utilize the same spreading codes, i.e. ortogonality between the transmissions on the different streams is only provided via the pre-coder and not by means of using different channelization codes.

Currently HSUPA does not allow MIMO transmission since only single stream transmissions are allowed in the uplink. However, if uplink MIMO is to be introduced for WCDMA/HSPA in 3GPP standard release 11, a scheme for allocation of channelisation codes to different UL MIMO streams should be predefined in the 3GPP standard. It is desirable that such a scheme for allocation of channelisation codes is particularly adapted to uplink transmissions and advantageously exploits differences between uplink and downlink transmissions.

Hereinafter, the term code allocation will be used to refer to allocation of channelisation codes. Channelisation codes may synonymously also be referred to as spreading codes. The term HS code allocation means High-Speed Physical Downlink Shared Channel (HS-PDSCH) code allocation in a HSUPA transmission.

SUMMARY

It is an object to provide methods and apparatuses that allow for channelisation code allocation adapted to uplink MIMO transmissions.

The above stated object is achieved by means of methods, and apparatuses according to the independent claims.

A first embodiment provides a method for use in a user equipment configured for uplink MIMO transmissions in a telecommunication system. The method comprises spreading data symbols of a plurality of streams to be transmitted from the user equipment as MIMO transmissions. The step of spreading the data symbols of the plurality of streams comprises allocating, for each stream, at least one channelisation code to be applied for spreading the data symbols of the stream. The plurality of streams are allocated channelisation codes from a predefined code tree of applicable channelisation codes such that any channelisation code is allocated to more than one stream only if there is no applicable channelisation code left in the code tree which currently is not allocated for any stream. The step of spreading the data symbols also comprises using the allocated channelisation codes for spreading the data symbols of each stream respectively.

A second embodiment provides a user equipment configured for uplink MIMO, transmissions. The user equipment comprises a processor configured to spread data symbols of a plurality of streams to be transmitted from the user equipment as MIMO transmissions. Spreading of the data symbols of the plurality of streams comprises allocating, for each stream, at least one channelisation code to be applied for spreading the data symbols of the stream. The processor is configured to allocate, for the plurality of streams, channelisation codes from a predefined code tree of applicable channelisation codes such that any channelisation code is allocated to more than one stream only if there is no applicable channelisation code left in the code tree which currently is not allocated for any stream. The processor is also configured to use the allocated channelisation codes for spreading the data symbols of each stream respectively.

A third embodiment provides a method for use in a user equipment configured for uplink MIMO transmissions. The method comprises a step of allocating channelisation codes for a plurality of streams to be transmitted from the user equipment as MIMO transmissions. The plurality of streams are allocated channelisation codes from a predefined code tree such that different streams are allocated channelisation codes from opposite directions of the code tree. The method also comprises using the allocated channelisation codes in uplink MIMO transmission of the plurality of streams.

A fourth embodiment provides a method for use in a user equipment configured for uplink MIMO transmissions. The method comprises allocating channelisation codes for a plurality of streams to be transmitted from the user equipment as MIMO transmissions. The plurality of streams are allocated channelisation codes sequentially from a predefined indexed code tree such that an ending channelisation code index of a first stream is next to a starting channelisation code index of a second stream. The method also comprises using the allocated channelisation codes in uplink MIMO transmission of the plurality of streams.

A fifth embodiment provides a user equipment configured for uplink MIMO transmissions in a telecommunication system. The user equipment comprises a processor configured for allocating channelisation codes for a plurality of streams to be transmitted from the user equipment as MIMO transmissions. The processor is configured to allocate channelisation codes for the plurality of streams from a predefined code tree such that different streams are allocated channelisation codes from opposite directions of the code tree. The processor is further configured to use the allocated channelisation codes in uplink MIMO transmission of the plurality of streams.

A sixth embodiment provides a user equipment configured for uplink MIMO transmissions in a telecommunication system. The user equipment comprises a processor configured for allocating channelisation codes for a plurality of streams to be transmitted from the user equipment as MIMO transmissions. The processor is configured to allocate channelisation codes for the plurality of streams sequentially from a predefined indexed code tree such that an ending channelisation code index of a first stream is next to a starting channelisation code index of a second stream. The processor is further configured to use the allocated channelisation codes in uplink MIMO transmission of the plurality of streams.

An advantage of some of the embodiments of this disclosure is that a channelisation code allocation scheme adapted to uplink MIMO transmissions is provided.

Another advantage of some of the embodiments of this disclosure is that inter-stream interference for uplink MIMO transmissions may be avoided to a large extent in many scenarios.

Further advantages and features of embodiments of the present invention will become apparent when reading the following detailed description in conjunction with the drawings.

DETAILED DESCRIPTION

Figure 1:
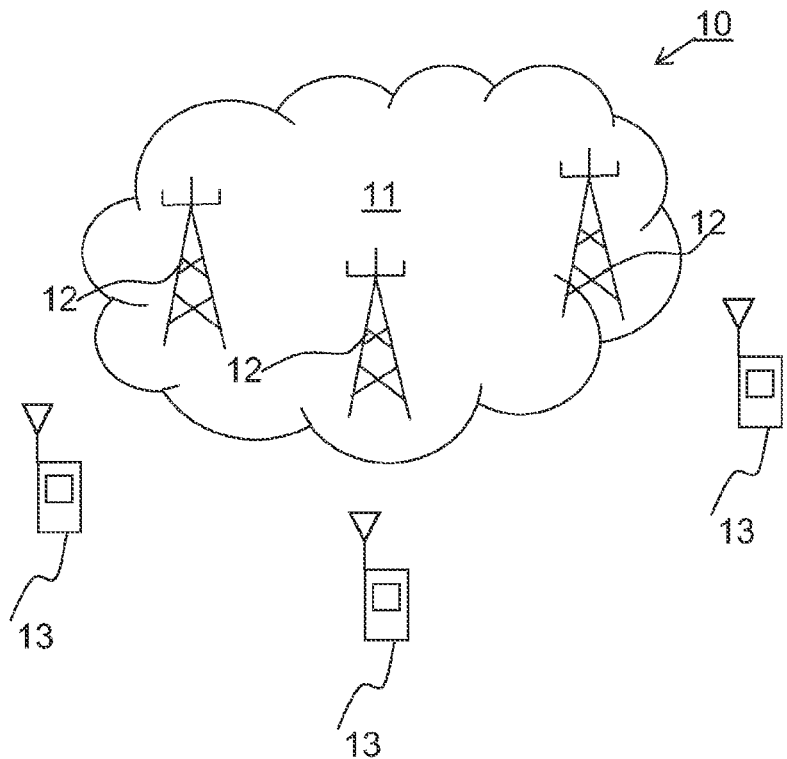
FIG. 1 is a schematic diagram illustrating a communication system in which different embodiments of this disclosure may be implemented.

The embodiments of this disclosure will now be described more fully hereinafter with reference to the accompanying drawings, in which different example embodiments are shown. These example embodiments are provided so that this disclosure will be thorough and complete and not for purposes of limitation. In the drawings, like reference signs refer to like elements.

Spreading is applied to physical channels in e.g. a HSPA system. The spreading consists of two operations. The first is a channelisation operation, which transforms every data symbol into a number of chips, thus increasing the bandwidth of the signal. The number of chips per data symbol is called the spreading factor (SF). The second operation is the scrambling operation, where a scrambling code is applied to the spread signal. The channelisation codes used for HSPA are Orthogonal Variable Spreading Factor (OVSF) codes that preserve the orthogonality between different physical channels that use different channelisation codes (given a single tap channel characterized by zero delay spread). As described in the standard document 3GPP TS 25.213 V10.0.0 (2010-09) "Spreading and modulation (FDD)", the channelisation codes can be defined using a code tree where each level in the code tree defines channelisation codes corresponding to a particular spreading factor. According to the 3GPP standard, different channelisation codes are reserved for different types of physical channels, such as e.g. E-DCH Dedicated Physical Control Channel (E-DPCCH), E-DCH Dedicated Physical Data Channel (E-DPDCH), Dedicated Physical Control Channel (DPCCH), and Dedicated Physical Data Channel (DPDCH). Thus when performing a spreading operation for a set of data symbols, the spreading codes that are applicable for spreading the set of data symbols will depend on the spreading factor to be used and on the type of physical channel associated with the set of data symbols. Thus the expression "applicable channelisation codes" will be used herein to refer to channelisation codes that are applicable both with respect to the spreading factor to be used and with respect to the type of physical channel for which the spreading is to be carried out.

The embodiments disclosed herein relate to spreading in case of uplink MIMO transmissions. For HSPA, uplink MIMO is considered for the E-DPDCH. Thus the embodiments disclosed herein would typically be used for E-DPDCH spreading.

The inventors have realised that a code reuse between different streams will be necessary for certain high data rates of uplink MEMO transmissions. However, unlike the downlink MIMO transmissions, the spreading code resource is not shared among UEs served by a cell. This is because each UE, in the uplink, uses an individual scrambling code. This means that a UE can allocate spreading codes in uplink transmission without considering the spreading codes consumed by other UEs served by the same cell. A consequence of this is that there is a larger flexibility for spreading code allocation for uplink MIMO compared to downlink MIMO. To exploit this flexibility, embodiments of code allocation schemes that reduce the amount of code resources that are reused amongst streams are disclosed herein. An improved performance could be expected for these schemes since inter-stream interference can be avoided to a high extent in case of moderate data rates and to a certain extent in case of high data rates.

Embodiments of this disclosure may be if implemented in a network such as that of the telecommunication system 10 illustrated in FIG. 1. As shown in FIG. 1, an example network 11 may include one or more instances of user equipments (UEs) 13 and one or more base stations 12 capable of communicating with the UEs 13, along with any additional elements suitable to support communication between UEs or between a UE and another communication device (such as a landline telephone). Although the illustrated UEs 13 may represent communication devices that include any suitable combination of hardware and/or software, these UEs may, in particular embodiments, represent devices such as the example UE illustrated in greater detail by FIG. 13. Similarly, although the illustrated base stations 12 may represent network nodes that include any suitable combination of hardware and/or software, these base stations may, in particular embodiments, represent devices such as the example base station 12 illustrated in greater detail by FIG. 2.

Figure 2:
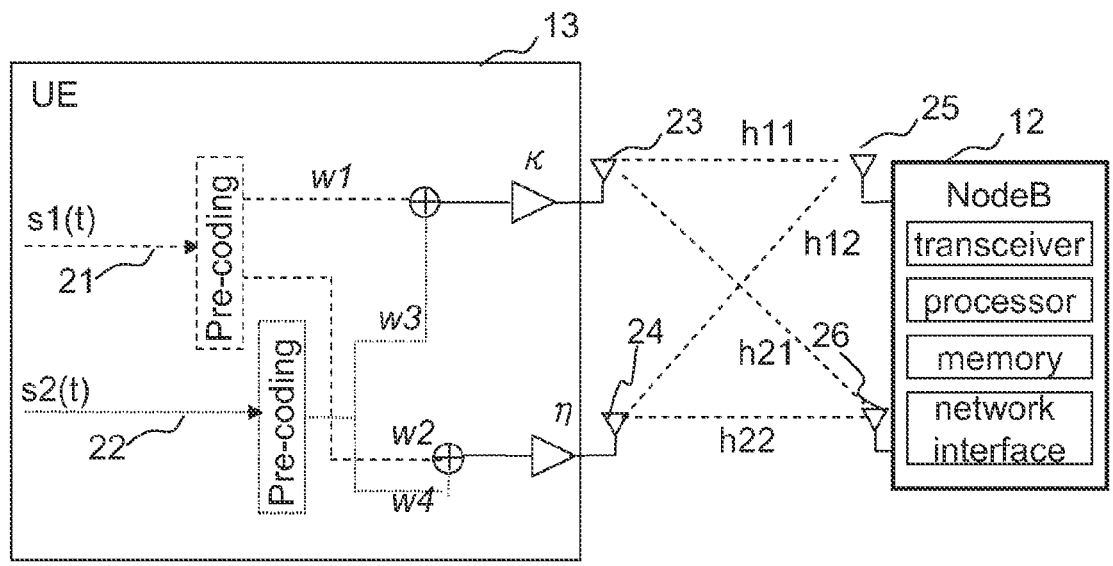
FIG. 2 is a schematic block diagram illustrating an embodiment of a communication system supporting uplink MIMO.

FIG. 2 is a schematic block diagram illustrating a system in which different embodiments of this disclosure may be implemented. FIG. 2 shows a UE 13 configured to support uplink MIMO transmissions for the communication with a network node 12, which for instance may be a serving NodeB. The example UE 13 is illustrated with two physical transmit antennas 23, 24 and the network node 12 is illustrated with two physical receive antennas 25, 26. The composite channel between the UE 13 and the network node 12 comprises wireless channels h11, h12, h21 and h22 between the different transmit antennas 23, 24 and receive antennas 25, 26 as illustrated in FIG. 2.

Using uplink MIMO, different data, such as a first signal $s1(t)$ and a second signal $s2(t)$ as illustrated in FIG. 2, are transmitted in different streams 21, 22. Here parts with dashed border are associated with a first stream 21 and parts with dotted borders are associated with a second stream 22. Signals associated with the first stream 21 are pre-coded with pre-coding weights w1 and w2 prior to transmission from the different physical antennas 23 and 24. Signals associated with the second stream 22 are pre-coded with pre-coding weights w3 and w4 prior to transmission from the different physical antennas 23 and 24.

Figure 3:
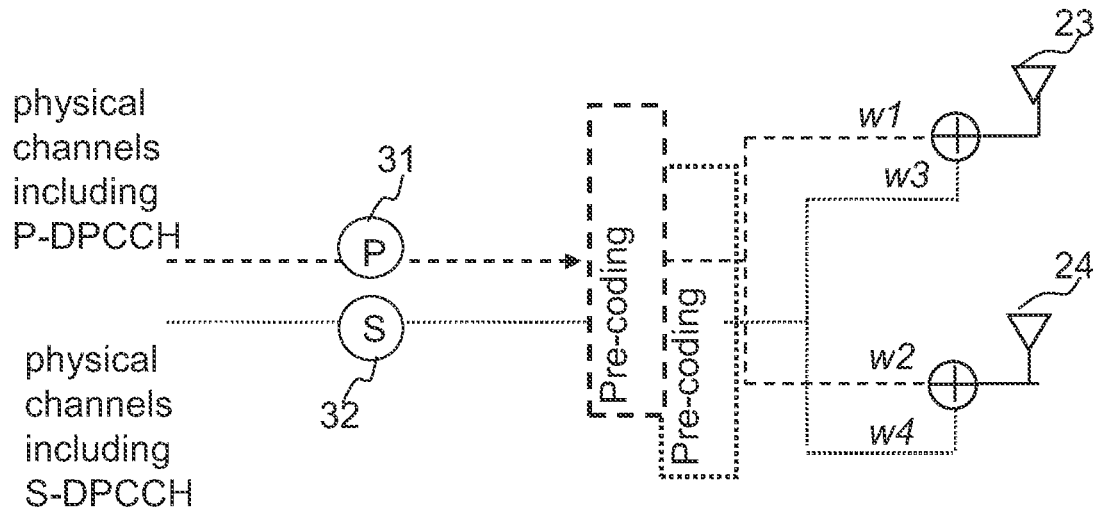
FIG. 3 is a schematic block diagram illustrating an embodiment of a user equipment architecture which can support uplink MIMO.
Figure 4:
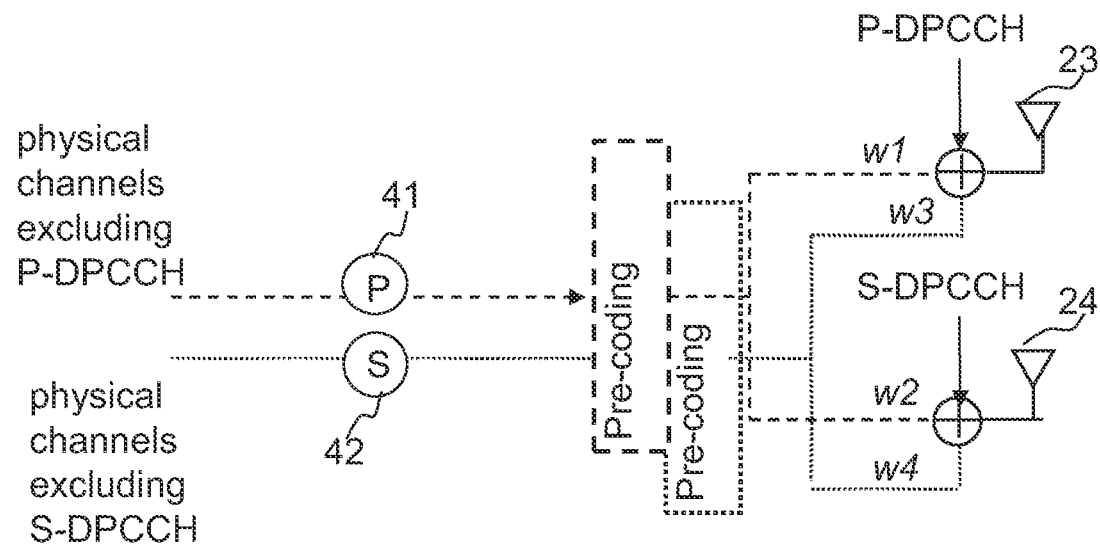
FIG. 4 is a schematic block diagram illustrating an alternative embodiment of a user equipment architecture which can support uplink MIMO.

FIGS. 3 and 4 illustrate two possible UE architectures for a UE configured in uplink MIMO mode comprising two physical antennas 23 and 24 and configured to use two streams for uplink MIMO transmissions. In FIG. 3 a primary DPCCH (P-DPCCH) pilot and a secondary DPCCH (S-DPCCH) pilot are pre-coded with the same pre-coding vectors as used for pre-coding the other physical channels transmitted for each stream. The P-DPCCH is associated with a stream 31 and the S-DPCCH is associated with a stream 32. In FIG. 4 the P-DPCCH and S-DPCCH are not pre-coded and are associated with streams 41 and 42 respectively.

Figure 5:
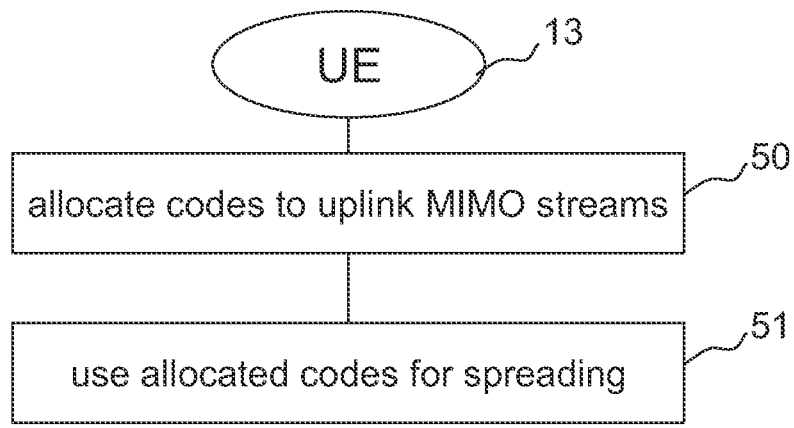
FIG. 5 is a flow diagram illustrating an embodiment of a method for uplink spreading.

FIG. 5 is a flow diagram illustrating an example embodiment of a method for uplink spreading. The method is for use in a UE 13 configured for uplink MIMO transmissions and is applicable to a CDMA-based technology such as e.g. HSUPA. The method comprises spreading data symbols of a plurality of streams to be transmitted from the UE 13 as MIMO transmissions. The spreading comprises a step 50 of allocating, for each stream, at least one channelisation code to be applied for spreading the data symbols of the stream. According to this example embodiment, the plurality of streams are allocated channelisation codes from a predefined code tree of applicable channelisation codes such that any channelisation code is allocated to more than one stream only if there is no applicable channelisation code left in the code tree which currently is not allocated for any stream. The method also comprises a step 51 of using the allocated channelisation codes for spreading the data symbols of each stream respectively.

Figure 6:
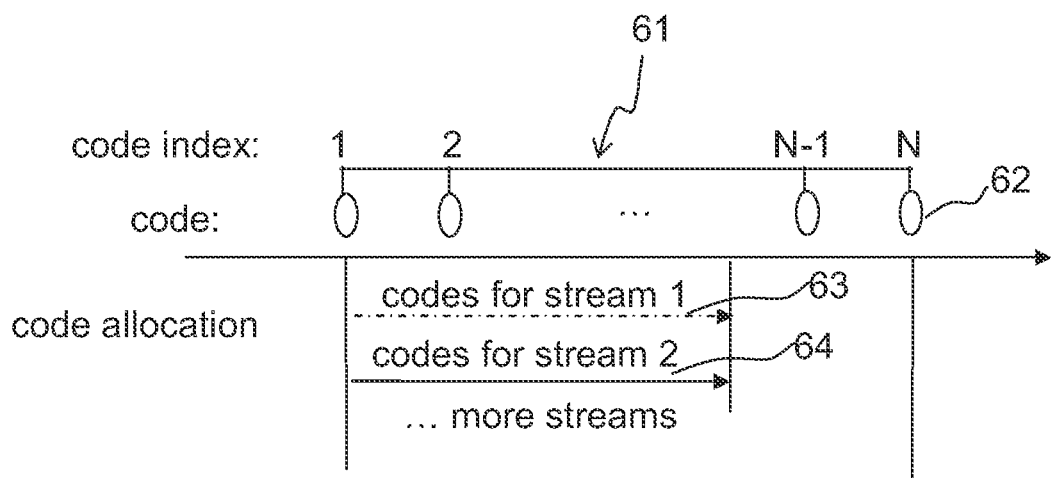
FIG. 6 is a schematic diagram illustrating an example of a channelisation code allocation scheme.

The channelisation code allocation scheme according to the step 50 leads to a maximization of the channelisation code utilization of the resource of applicable channelisation codes. Alternatively this can be viewed as a scheme that reduces or minimizes the fraction of the channelisation codes that are used by all streams. This channelisation code allocation scheme allows for better suppression of inter-stream interference of multiple stream transmissions, compared to a conservative channelisation code allocation scheme. According to a conservative channelisation code allocation scheme each stream uses exactly the same spreading codes as illustrated in FIG. 6. In FIG. 6 a code tree 61 of applicable channelisation codes 62 is illustrated. It is also schematically illustrated that a first set of codes 63 is allocated to a first stream and a second set of codes 64, which consists of the same codes as the first set 63, is allocated to the second stream. This is a simple code allocation scheme but it does not allow for as good inter-stream interference suppression as the scheme described above with reference to FIG. 5, according to which reuse of codes between multiple streams is avoided if possible.

In case of uplink MIMO transmission of a UE, it is not always that the transport block size of a stream is large enough to occupy all available channelisation codes, i.e. a stream may use a subset of the applicable channelisation codes. According to embodiments disclosed herein, there are two principles for allocating the channelisation codes in order to reduce the amount of channelisation codes that are used for all streams in case of multiple-stream transmission in the uplink:

1. The utilization of the spreading code resource is maximized.
2. The average utilization of each spreading code could preferably be as close (even) as possible.

By applying the above principles for the channelisation code allocation, the experienced inter-stream interference between different streams can be balanced.

In the following several more detailed examples on how to allocate the channelisation codes between multiple streams are presented. The examples describe channelisation allocation schemes intended for standardization. Preferably a certain channelisation allocation scheme is mandated/prescribed in the air technical specification/standard defining the interface between UE and Node B. This way there is no need for exchange of additional control information for data demodulation in multiple-stream transmissions and it is e.g. not necessary to indicate the spreading code allocation to the Node B.

Figure 7:
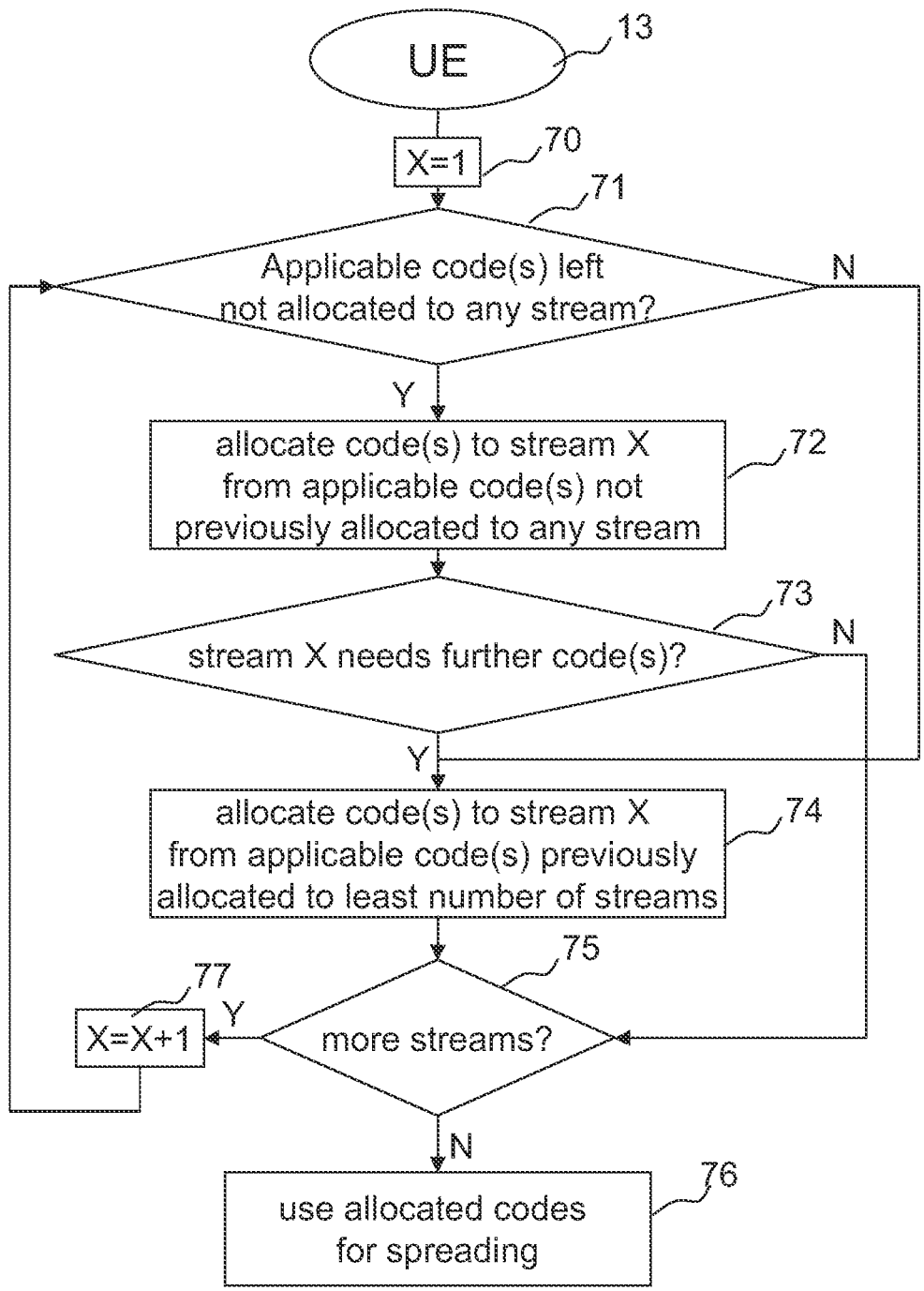
FIG. 7 is a flow diagram illustrating an alternative embodiment of a method for uplink spreading.

FIG. 7 is a flow diagram illustrating, in more detail, an example of how the method in FIG. 5 may be implemented. The method is for use in a UE that is to transmit multiple uplink MIMO streams. In a step 70, a variable X is set to one upon initialisation of the method. The variable X is used to represent the stream that is currently being considered in a channelisation code allocation loop. In a step 71, it is examined whether there are any applicable codes left in the code tree which currently is not allocated for any stream. If there are one or several codes left that is/are not allocated to any stream, stream X is allocated one or several codes from the applicable code(s) not previously allocated to any stream in a step 72. In a step 73, it is examined whether the stream X needs more codes. If the previously unused codes allocated in the step 72 to the stream X are sufficient for the stream X, the allocation of codes to the stream X is complete. But if the stream X requires one or several additional codes, the stream X is allocated more code(s) in a step 74. Since, there are no codes left in the code tree now, which currently are not allocated to any stream already, the stream X will be allocated reused codes (i.e. codes already allocated to another stream) in the step 74. The reused codes allocated in the step 74 are preferably selected from the code(s) previously allocated to the least number of streams. When the allocation of codes to the stream X is completed, it is examined in a step 75 whether there are any additional streams that should be allocated channelisation codes. If there is another stream left, X is incremented by one in a step 77 and the step 71 is repeated for the next stream. When channelisation codes have been allocated to all streams, the allocated channelisation codes are used in a step 76 for spreading data symbols of the respective streams to which the codes have been allocated.

Figure 8:
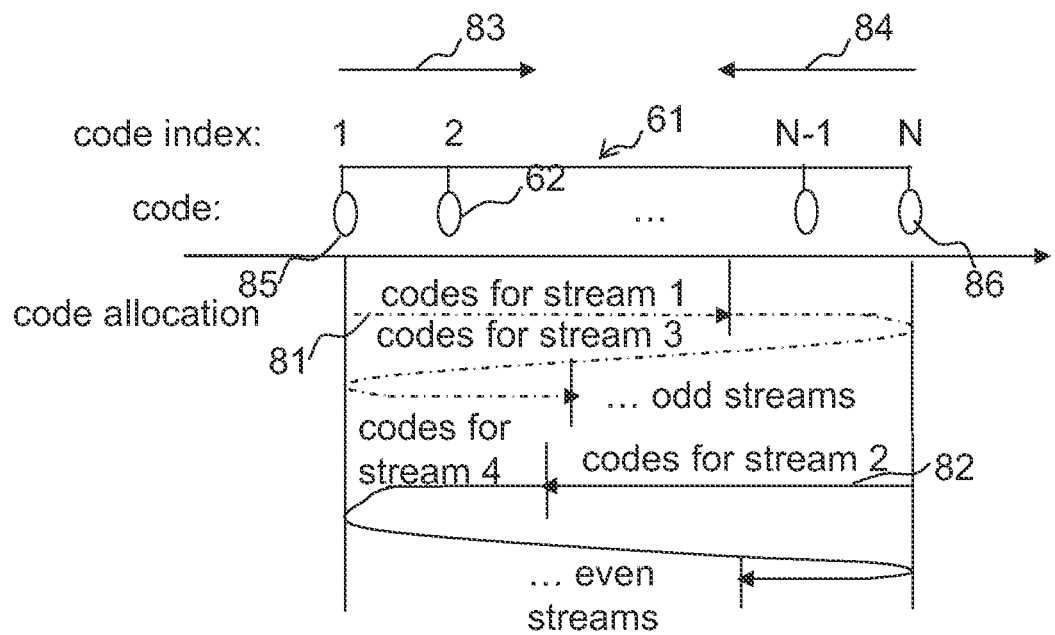
FIGS. 8, 9, 10, 11 and 12 are all schematic diagrams illustrating alternative example embodiments of channelisation code allocation schemes.

There are many different approaches that may be used for code allocation to avoid reuse of codes between streams if possible. FIG. 8 is a schematic illustration of a code avocation scheme wherein the channelisation codes are allocated for different MIMO streams from opposite directions. In this example, there are N codes that can be used by an uplink MIMO user transmitting multiple streams. The number of applicable codes depends on the serving grant associated with the stream(s). Based on the serving grant, an E-DCH Transport Format Combination (E-TFC) selection is made. The used spreading factor will in turn be decided by the E-TFC selection. The spreading factor will determine how much of the code tree that is used by the different streams. In scenarios where the amount of data that is transmitted by the UE for the different streams is such that not the entire code-tree is used for each individual stream, inter-stream interference can be reduced by reducing the portion of spreading codes that are used by all streams. This can be achieved, for example, by allocating spreading codes for MIMO streams with odd stream index from left to right while the spreading codes for MIMO streams with even stream index are allocated from right to left (or vice versa). This approach is illustrated in FIG. 8. The code tree 61 of N applicable codes 62 is illustrated in FIG. 8. The codes 62 in the code tree 61 are ordered such that it is possible to define a first direction 83 and a second direction 84 in the code tree. The first and second directions are opposite directions. In FIG. 8 it can be seen that a first a first stream is allocated a first sequence 81 of channelisation codes 62 and a second stream is allocated a second sequence 82 of channelisation codes 62. The first sequence 81 of channelisation codes comprises channelisation codes 62 from a first predefined channelisation code 85 followed by one or several channelisation codes which is/are subsequent to the first predefined channelisation code 85 in the first direction 83, The second sequence 82 comprises channelisation codes 62 from a second predefined channelisation code 86 followed by one or several channelisation codes which is/are subsequent to the second predefined channelisation code 86 in the second direction 84.

In the example illustrated in FIG. 8, the starting point of the first sequence 81, i.e. the first predefined channelisation code 85, is the code with index 1, while the starting point of the second sequence 82, i.e. the second predefined channelisation code 86, is the code with index N. This is a natural and simple choice of starting points for the different code sequences, but other starting points could also be used such as two codes in the middle of the code tree 61 from which the two sequences extend in opposite directions.

Figure 9:
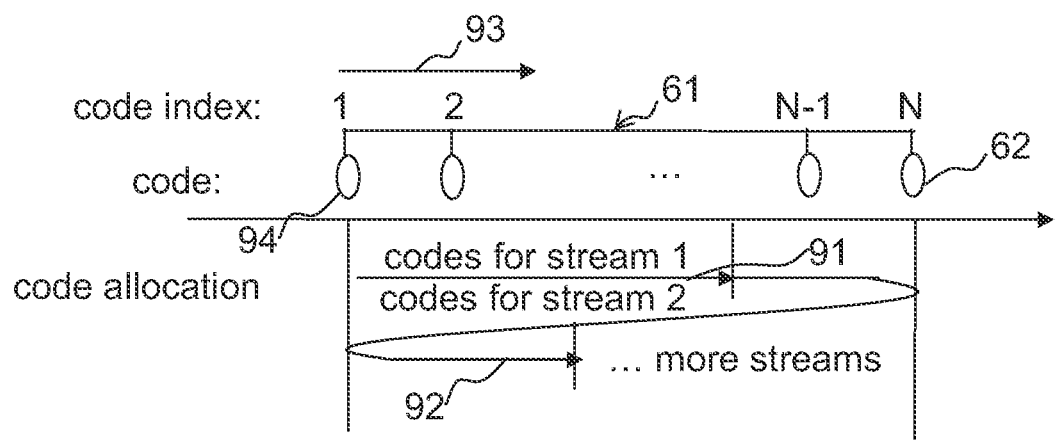

FIG. 9 is a schematic illustration of a code allocation scheme wherein the channelisation codes are allocated for different MIMO streams sequentially from the same direction. The starting spreading code index of the next stream is next to the ending spreading code of the previous stream. In this way, the code utilization reuse is reduced/minimized. In FIG. 9 it can be seen that a first stream is allocated a first sequence 91 of channelisation codes 62 and a second stream is allocated a second sequence 92 of channelisation codes 62. The first sequence 91 of channelisation codes comprises channelisation codes 62 from a first predefined channelisation code 94 followed by one or several channelisation codes which is/are subsequent to the first predefined channelisation code 94 in a first direction 93 in the code tree 61. The second sequence of channelisation codes comprises channelisation codes 62 from a second channelisation code followed by one or several channelisation codes which is/are subsequent to the second channelisation code in the first direction 93. In the example illustrated in FIG. 9, the second channelisation code, which is the starting point of the second sequence, is the code next to the last channelisation code of the first sequence in the first direction 93 of the code tree 61. A potential difficulty related to the scheme of FIG. 9 is, with regard to decoding, that correct information of the start of spreading codes of a stream depends on correct decoding of E-TFC Indexes (E-TFCIs) of all previous streams. This may require an even more robust E-TFCI transmission in uplink. The impact of this requirement can, e.g., be reduced if the same transport block size, i.e. identical spreading factor, is used for all streams.

The first direction 93 in the example of FIG. 9 is the direction corresponding to increasing code index numbers, but it is also possible to e.g. start from the code index N and allocate codes in the direction corresponding to decreasing code index numbers.

The example scheme of FIG. 9 can be expected to provide similar interferer suppression as the example scheme illustrated in FIG. 8.

In both of the example schemes illustrated in FIGS. 8 and 9, the streams are allocated channelisation codes which are consecutively ordered in the code tree. However, according to other example embodiments the streams may be allocated code sequences which consist of e.g. every second or every third code of a range of the code tree 61. When the code allocation scheme illustrated in FIG. 9 is used, it is natural that the second sequence 92 is subsequent to the first sequence 91 in the first direction 93. However, if e.g. the first stream is allocated codes with odd index numbers in the first direction and the second stream is allocated codes with even index numbers in the first direction, the code sequences allocated to the different streams will partly cover the same range of the code tree when the code avocation to both streams starts from the lowest index numbers of the code tree. In other words, the first stream is allocated codes with indexes 1, 3, 5, 7 and the second stream is allocated codes with indexes 2, 4, 6 and 8 according to an example where each stream is allocated four channelisation codes.

Figure 10:
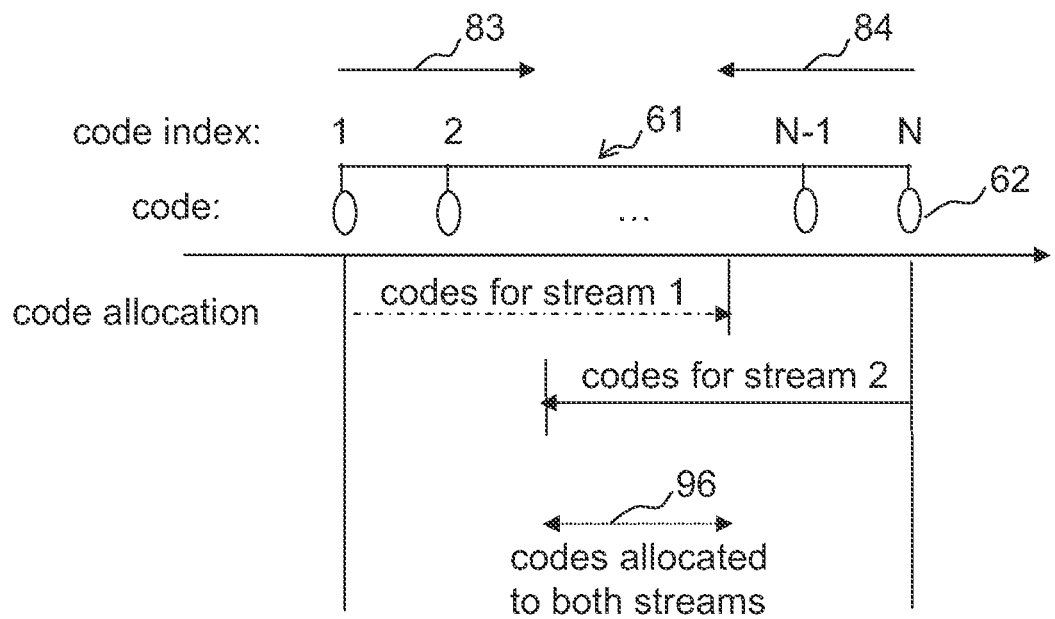
Figure 11:
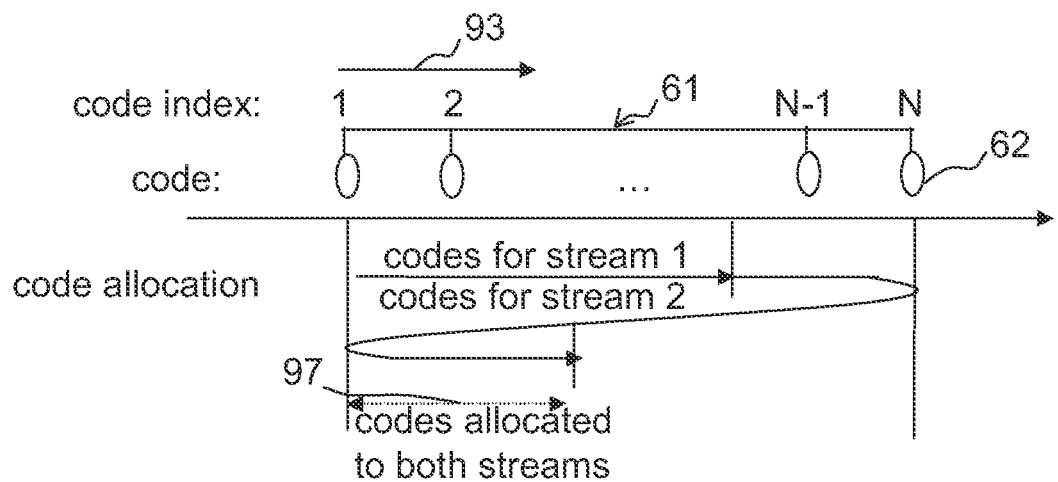

As mentioned above, a code reuse between different streams will be necessary for certain high data rates of uplink MIMO transmissions. The embodiments described above are however aiming at reducing or minimizing the fraction of the channelisation codes that are used by all streams. FIGS. 10 and 11 illustrate code reuse for two example scenarios. FIG. 10 illustrates a scenario of code allocation to two streams according to the scheme illustrated in FIG. 8. Codes which are allocated to both streams are indicated with a double arrow 96. According to this scheme codes in a middle portion of the code tree will be reused first, since the code allocation for the different streams is carried out from different ends and in opposite directions of the code tree. FIG. 11 illustrates a scenario of code allocation to two streams according to the scheme illustrated in FIG. 9. Codes which are allocated to both streams are indicated with a double arrow 97. According to this scheme codes in the end portion of the code tree from where the code allocation starts will be reused first, since the code allocation for the different streams is carried out sequentially from the same direction.

Figure 12:
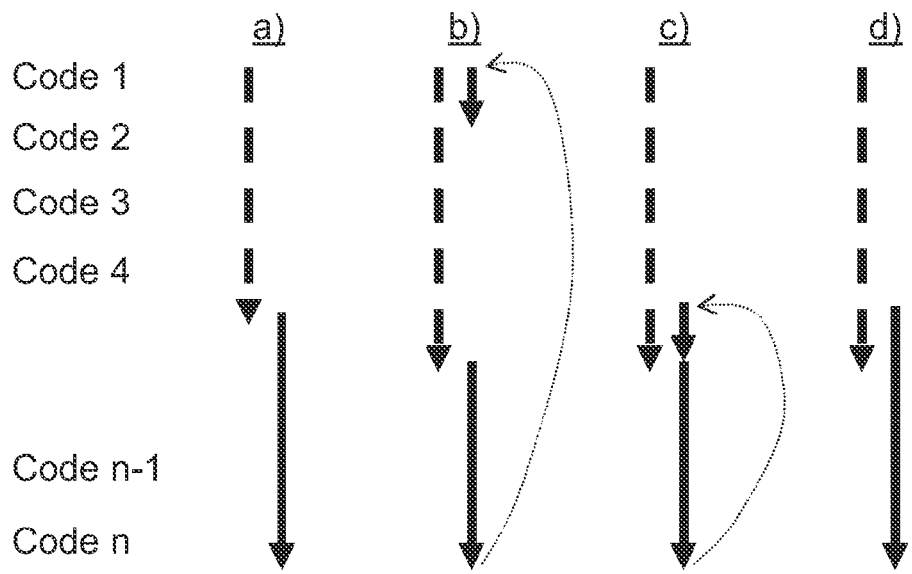

During operation of a code allocation scheme, when an end of the code tree is reached before the allocation of codes to a particular stream is completed, so-called wrap around is required to allocate further codes to the particular stream. There are different options for how to handle wrap around as illustrated in FIG. 12. FIG. 12 illustrates four different scenarios a), b), c) and d) of sequential code allocation to a first stream (represented by dashed arrows) and to a second stream (represented by solid arrows). According to the illustrated example a), no wrap around is necessary since a sufficient number of codes can be allocated to the second stream before the end of the code tree (i.e. Code n) is reached and there is no reuse of codes. In scenarios b) and c) wrap around is necessary since the second stream requires further codes when the last code of the code tree (i.e. Code n) has been allocated to the second stream. According to the scenario b) the code allocation scheme "wraps around" to the beginning of the code tree, i.e. continues to allocate the Code 1 to the second stream after allocation of the Code n. According to the scenario c) the code allocation scheme "wraps around" to a middle portion of the code tree. According to scenario d) the second stream is allocated the same codes as in scenario c), but it is foreseen to what extent a code reuse is required and the allocation of codes to the second stream starts from a code in the code tree that allows the second stream to be allocated the Code n as the last code of the sequence of codes allocated to the second stream. When referring herein to a channelisation code being subsequent to another channelisation code in a certain direction in the code tree, this expression is intended to encompass possible wrap around effects. Assume e.g. an example of a code tree of ten codes with respective indexes 1-10. Assume further that a stream is allocated a sequence of codes with indexes 7, 8, 9, 10, 1 and 2. In this sequence the codes with indexes 1 and 2 are considered to be subsequent to the code with index 10 in the direction of increasing index numbers in the code tree.

Figure 13:
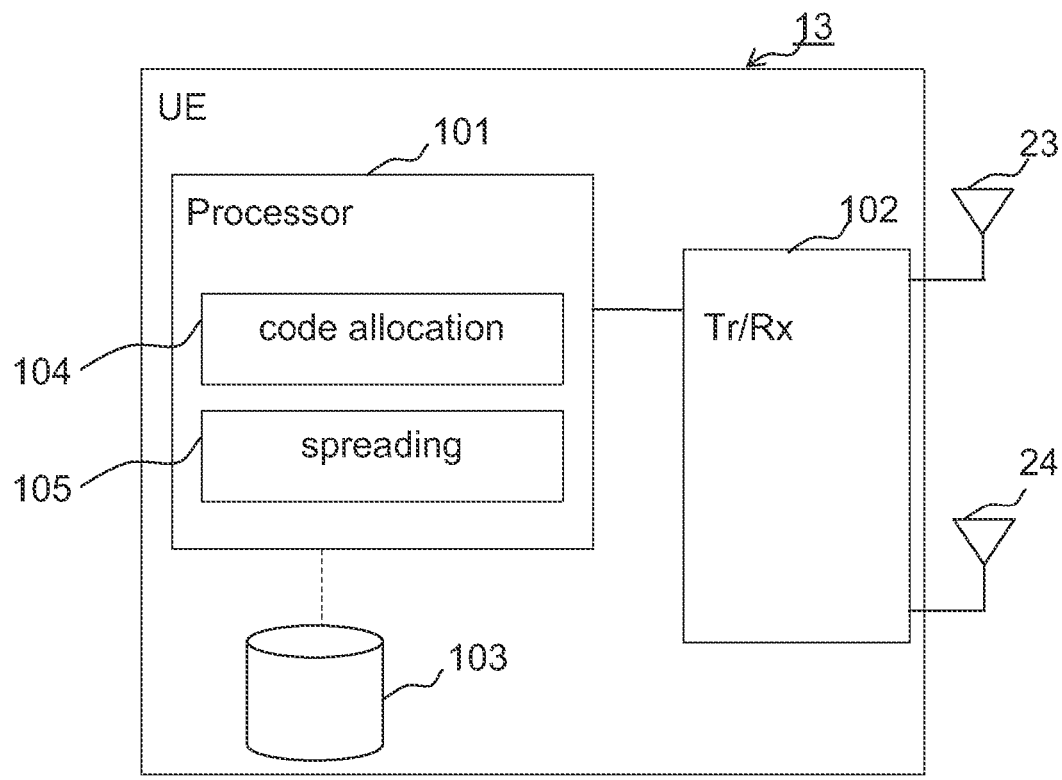
FIG. 13 is a schematic block diagram of a user equipment according to an example embodiment of this disclosure.

FIG. 13 is a schematic block diagram of an example embodiment of a UE 13, which may be configured to carry out the example methods and code allocation schemes illustrated in FIGS. 5-12. As shown in FIG. 13, the example UE 13 includes a processor 101, a memory 103, a transceiver 102, and antennas 23 and 24. The antennas 23 and 24 may be embodied as different antenna elements of a multi-element antenna. In particular embodiments, some or all of the functionality described above as being provided by a UE, may be provided by the UE processor 101 executing instructions stored on a computer-readable medium, such as the memory 103 shown in FIG. 13. Thus the processor 101 may be configured to execute instructions of different software modules, such as a software module 104 comprising program instructions for implementing UE functionality with respect to the channelisation code allocation of the different embodiments described above, or a software module 105 comprising program instructions for implementing use of allocated channelisation codes for spreading according to the different embodiments described above. Alternative embodiments of the UE may include additional components beyond those shown in FIG. 13 that may be responsible for providing certain aspects of the UE's functionality, including any of the functionality described above and/or any functionality necessary to support the embodiments described above.

Although most embodiments of this disclosure are described in a context of a UE and a Node-B equipped with two transmit antennas/antenna elements and for the UE architectures described in FIGS. 2, 3 and 4, the disclosure is also applicable to settings with a larger number of transmit and receive antennas.

From the description above it is apparent that some of the embodiments of this disclosure enables reduced inter-stream interference for uplink-MIMO transmissions.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method implemented by a user equipment for spreading data symbols of a plurality of streams to be transmitted from the user equipment as uplink Multiple-Input Multiple-Output, MIMO, transmissions in a telecommunication system, the method comprising:
    allocating at least one channelisation code from a predefined code tree of applicable channelisation codes to each stream, and reallocating one or more channelisation codes to any remaining streams in the plurality of streams only if all channelisation codes have already been allocated, wherein the one or more channelisation codes reallocated to any remaining streams is selected from applicable codes previously allocated to a least number of streams; and
    spreading the data symbols of each stream of the plurality of streams using the at least one channelisation code respectively allocated to that stream, wherein the plurality of streams are transmitted from the user equipment, each on a different antenna, as uplink MIMO transmissions.

2. The method according to claim 1, wherein the code tree comprises ordered channelisation codes and wherein said allocating comprises allocating channelization codes to different streams from opposite directions of the code tree.

3. The method according to claim 2, wherein said allocating comprises:
    allocating to a first stream a first sequence of channelisation codes that comprises channelisation codes from a first predefined channelisation code followed by at least one channelisation code which is subsequent to the first predefined channelisation code in a first direction of the code tree; and
    allocating to a second stream a second sequence of channelisation codes that comprises channelisation codes from a second predefined channelisation code followed by at least one channelisation code which is subsequent to the second predefined channelisation code in a second direction of the code tree opposite said first direction.

4. The method according to claim 1, wherein the code tree comprises ordered channelisation codes and wherein said allocating comprises allocating channelization codes to multiple streams from the same direction of the code tree.

5. The method according to claim 4, wherein said allocating comprises:
    allocating to a first stream a first sequence of channelisation codes that comprises channelisation codes from a first predefined channelisation code followed by at least one channelisation code which is subsequent to the first predefined channelisation code in a first direction of the code tree; and
    allocating to a second stream a second sequence of channelisation codes that comprises channelisation codes from a second channelisation code followed by at least one channelisation code which is subsequent to the second channelisation code in said first direction of the code tree.

6. The method according to claim 5, wherein said second sequence is subsequent to said first sequence in said first direction.

7. The method according to claim 1, wherein said allocating comprises allocating to each stream channelisation codes which are consecutively ordered in the code tree.

8. The method according to claim 1, wherein the channelisation codes of the code tree which are applicable for allocation to a given stream are determined by a spreading factor associated with that stream.

9. The method according to claim 1, wherein said data symbols of the plurality of streams are data symbols associated with E-DCH Dedicated Physical Data Channels of the plurality of streams.

10. A user equipment configured to spread data symbols of a plurality of streams to be transmitted from the user equipment as uplink Multiple-Input Multiple-Output, MIMO, transmissions in a telecommunication system, wherein the user equipment comprises a processor configured to:
    allocate at least one channelisation code from a predefined code tree of applicable channelisation codes to each stream, and reallocate one or more channelisation codes to any remaining streams in the plurality of streams only if all channelisation codes have already been allocated, wherein the one or more channelisation codes reallocated to any remaining streams is selected from applicable codes previously allocated to a least number of streams; and
    spread the data symbols of each stream of the plurality of streams using the at least one channelisation code respectively allocated to that stream, wherein the plurality of streams are transmitted from the user equipment, each on a different antenna, as uplink MIMO transmissions.

11. The user equipment according to claim 10, wherein the code tree comprises ordered channelisation codes and the processor is configured to allocate channelization codes to different streams from opposite directions of the code tree.

12. The user equipment according to claim 11, wherein the processor is configured to:
    allocate to a first stream a first sequence of channelisation codes that comprises channelisation codes from a first predefined channelisation code followed by at least one channelisation code which is subsequent to the first predefined channelisation code in a first direction of the code tree; and
    allocate to a second stream a second sequence of channelisation codes that comprises channelisation codes from a second predefined channelisation code followed by at least one channelisation code which is subsequent to the second predefined channelisation code in a second direction of the code tree opposite said first direction.

13. The user equipment according to claim 10, wherein the code tree comprises ordered channelisation codes and the processor is configured to allocate channelization codes to multiple streams from the same direction of the code tree.

14. The user equipment according to claim 13, wherein the processor is configured to:
    allocate to a first stream a first sequence of channelisation codes that comprises channelisation codes from a first predefined channelisation code followed by at least one channelisation code which is subsequent to the first predefined channelisation code in a first direction of the code tree; and
    allocate to a second stream a second sequence of channelisation codes that comprises channelisation codes from a second channelisation code followed by at least one channelisation code which is subsequent to the second channelisation code in said first direction of the code tree.

15. The user equipment according to claim 14, wherein said second sequence is subsequent to said first sequence in said first direction.

16. The user equipment according to claim 10, wherein the processor is configured to allocate to each stream channelisation codes which are consecutively ordered in the code tree.

17. The user equipment according to claim 10, wherein the channelisation codes of the code tree which are applicable for allocation to a given stream are determined by a spreading factor associated with that stream.

18. The user equipment according to claim 10, wherein said data symbols of the plurality of streams are data symbols associated with E-DCH Dedicated Physical Data Channels of the plurality of streams.

* * * * *